United States Patent
Balch et al.

[19]

[11] Patent Number: 6,118,378
[45] Date of Patent: Sep. 12, 2000

[54] PULSED MAGNETIC EAS SYSTEM INCORPORATING SINGLE ANTENNA WITH INDEPENDENT PHASING

[75] Inventors: Brent F. Balch, Fort Lauderdale; Stephen W. Embling, Pompano Beach; Ming-Ren Lian, Boca Raton, all of Fla.

[73] Assignee: Sensormatic Electronics Corporation, Boca Raton, Fla.

[21] Appl. No.: 08/969,928

[22] Filed: Nov. 28, 1997

[51] Int. Cl.[7] .................................................. H04Q 1/00
[52] U.S. Cl. ........................ 340/572.7; 343/742; 343/867
[58] Field of Search ............................... 340/572.7, 10.2; 343/742, 867

[56] References Cited

U.S. PATENT DOCUMENTS

| | | | |
|---|---|---|---|
| 4,135,184 | 1/1997 | Pruzick | 340/572.2 |
| 4,527,152 | 7/1985 | Scarr et al. | 340/472 |
| 4,644,286 | 2/1987 | Torre | 329/50 |
| 4,658,241 | 4/1987 | Torre | 340/551 |
| 4,675,658 | 6/1987 | Anderson et al. | 340/551 |
| 4,679,046 | 7/1987 | Curtis | 340/572.2 |
| 4,963,880 | 10/1990 | Torre et al. | 343/866 |
| 5,023,600 | 6/1991 | Szklany et al. | 340/572 |
| 5,049,857 | 9/1991 | Plonsky et al. | 340/551 |
| 5,353,011 | 10/1994 | Wheeler et al. | 340/572 |
| 5,495,229 | 2/1996 | Balch et al. | 340/551 |
| 5,640,693 | 6/1997 | Balch et al. | 455/127 |
| 5,867,101 | 2/1999 | Copeland | 340/572.2 |
| 5,963,173 | 10/1999 | Lian | 340/572.2 |
| 6,020,856 | 2/2000 | Alicot | 340/572.2 |

*Primary Examiner*—Brian Zimmerman
*Attorney, Agent, or Firm*—Quarles & Brady LLP

[57] ABSTRACT

A single antenna transmits and receives signals. The single antenna has first and second antenna loops substantially lying in a common plane and partially overlapping. First and second transceiver circuits are coupled to the first and second antenna loops respectively, for respectively generating in a first mode of operation first and second pulsed magnetic fields together defining an interrogation zone for a marker generating a characteristic response to the magnetic fields in the interrogation zone, and for receiving signals from the interrogation zone in a second mode of operation. The first and second transceiver circuits alternately generate the first and second magnetic fields substantially in phase with one another and substantially out of phase with one another. The partially overlapping antenna loops prevent detuning of the transceivers otherwise resulting from the phase alternating. Each of the first and second transceiver circuits has a phase controllable transmitter section and a phase controllable receiver section. A controller independently phase controls the transmitter and receiver sections. Each receiver section is coupled across the tuned circuit of its respective transceiver circuit.

23 Claims, 3 Drawing Sheets

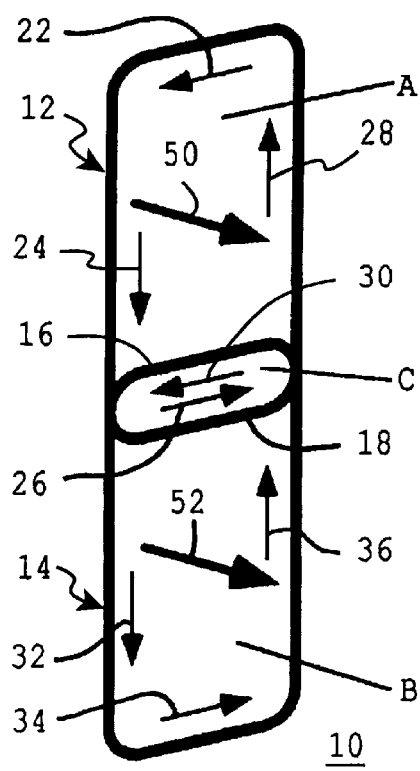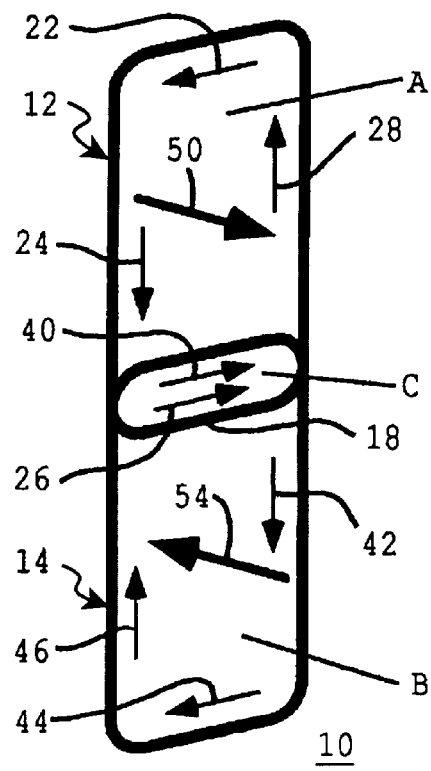
FIG. 1
FIG. 2
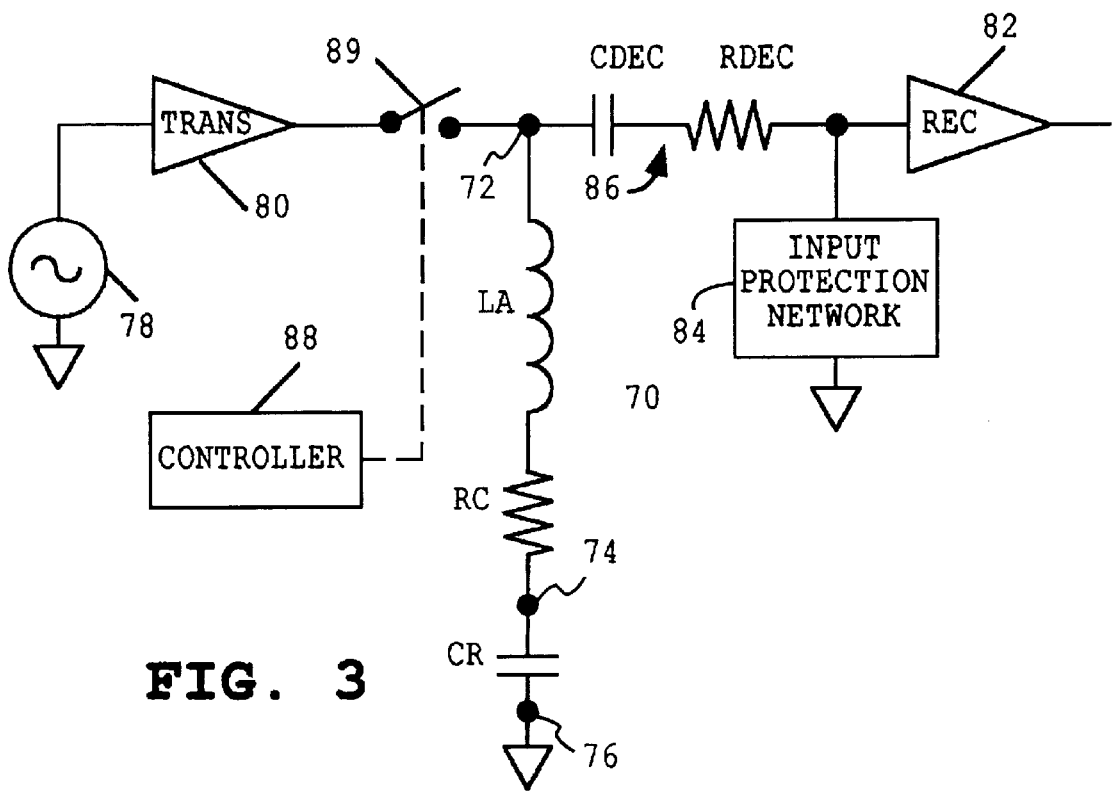
FIG. 3

PULSED MAGNETIC EAS SYSTEM INCORPORATING SINGLE ANTENNA WITH INDEPENDENT PHASING

BACKGROUND OF THE INVENTION

1. Field of the Invention

This invention relates to the field of pulsed magnetic electronic article surveillance (EAS) systems in general, and in particular, to pulsed magnetic EAS systems having one antenna for both transmitting and receiving with independent phasing.

2. Description of Related Art

In conventional EAS systems, transmit and receive functions are provided by separate antenna coils. The need for separate antenna coils is problematic. The manufacturing cost is higher due to the additional material cost, assembly and test time, as well as the additional documentation and quality checking that is required.

The transmit and receive fields sometimes do not coincide. As an example, when a tag or marker is located in an orientation or location wherein it is sufficiently stimulated by the transmit antenna field, the tag or marker may not be simultaneously in an orientation or location wherein the tag or marker can be optimally interrogated by the receive antenna.

In transceiver antenna assemblies, especially those wherein separate transmit and receive coils operate in close proximity, the magnetic field produced by the transmit coil induces a current in the nearby receiver coil. This current in the receiver coil can be significant due to the low impedance of protective shunting devices commonly employed to protect the receiver input from damaging potentials due to transformer action between the two coupled coils. This induced current flowing in the receiver coil produces a magnetic field of its own, which is in opposition to the field produced by the transmit antenna. Due to the interaction of the opposing fields produced by the transmit antenna and the receive antenna, the net magnetic field in the interrogation zone is diminished, resulting in a loss of efficiency and requiring higher transmitter power to establish the desired field strength.

In conventional EAS systems employing multiple transmitter coils, the transmitter field phasing relationship is fixed or selectable during the installation process. Accordingly, it is possible for a tag or marker to pass through the interrogation zone in an orientation or location such that it is not sufficiently stimulated to be detected by the receive antennas. Transmitter antennas used in magnetic EAS systems must typically be configured as resonant circuits in order to develop enough current to provide sufficient field strength for proper operation. When multiple transmit coils are operated in close proximity, their fields interact, resulting in impedance changes in each coil. Once multiple transmit antennas are tuned to resonance for a particular phase relationship, if this phase relationship is changed significantly, each of the coils will no longer be at its resonant peak and each coil's current will be reduced by an amount depending on the magnitude of the phase difference, the individual coil's quality factor (Q) and the coefficient of coupling between the respective coils. In a multi-coil transmitter antenna, the transmit coils must be resonated or tuned each time the field phasing changes substantially.

Most existing EAS systems utilize separate antenna coils for the transmit and receive functions of the system. The transmitter field phase relationship between coils is either fixed or, if electronically controlled, held constant during system operation.

The Ultra*Max product line available from Sensormatic Electronics Corporation does include a DoubleChecker device for reminding clerks to remove or deactivate magnetic labels or markers from protected items during the checkout process. The terms Ultra*Max and DoubleChecker are trademarks of Sensormatic Electronics Corporation. The antenna used in the DoubleChecker performs a dual function, but is conceptually and electrically different from the single transmit and receive antenna implementations explained above, and is unsuitable for use in a full system due to prohibitive reactive voltages.

A coplanar single coil dual function transmit and receive antenna for a proximate surveillance system is shown in U.S. Pat. No. 4,963,880 and comprises: a single coil having a perimeter and enclosing a unique region; means for driving the coil during the transmit intervals to generate and transmit time varying magnetic field components within the proximate region, the coil being driven on, producing components vertical and horizontal to the plane of the coil, which components are the result of fringing effects within the area approximated by the coil perimeter; circuit means connected to the coil for forming with the coil, during the transmit intervals, a series resonant tuned circuit and, during the receive intervals, an untuned circuit; and, tristate output switched-mode operating means connected to the circuit means for providing an intrinsic automatic changeover of the circuit means between the tuned and untuned circuits.

Some pulsed magnetic EAS systems, for example those available from Sensormatic Corporation, synchronize their operation by sensing the local power line positive zero crossings, as shown in FIG. 5. Each line cycle is divided up into six alternating time windows: three windows for transmission and three windows for reception. The first transmit-receive window sequential pair occurs at 0° with respect to the zero crossing, the second first transmit-receive window sequential pair occurs at 120° with respect to the zero crossing and the third first transmit-receive window sequential pair occurs at 240° with respect to the zero crossing.

SUMMARY OF THE INVENTION

The EAS system in accordance with the inventive arrangements taught herein represents an improvement over previous designs in allowing the same antenna coil for both transmit and receive functions, while at the same time permitting independent phasing relationships between transmit and receive functions with regard to other system antenna coils, resulting in significant performance enhancement as well as cost savings.

Additionally, the unique coil arrangement allows the field phase from multiple transmitter coils to change substantially without changing their resonant frequency and without a resulting loss in transmitter current.

An electronic article surveillance system, in accordance with an inventive arrangement, comprises: an antenna having first and second antenna loops; first and second transceiver circuits coupled to the first and second antenna loops respectively, for respectively generating in a first mode of operation first and second magnetic fields together defining an interrogation zone for a marker generating a characteristic response to the magnetic fields in the interrogation zone, and for receiving signals from the interrogation zone in a second mode of operation; the first and second transceiver circuits, when transmitting, alternately generating the first and second magnetic fields substantially in phase with one another and substantially out of phase with one another; and, a detector for evaluating an output signal, representative of the signals received by the first and second transceiver circuits from the interrogation zone, for the characteristic response of the marker.

Advantageously, the first and second antenna loops substantially lie in a common plane and partially overlap.

The first transceiver circuit comprises: a first signal generator; a first receiver; and, a first transmitter responsive to the first signal generator and coupled to the first antenna loop and to the first receiver. The second transceiver circuit comprises: a second signal generator; a second receiver; and, a second transmitter responsive to the second signal generator and coupled to the second antenna loop and to the second receiver.

The system can advantageously further comprise a controller for the first and second transceiver circuits, the controller being responsive to the detector. The controller advantageously establishes the alternating generation of the magnetic field phases when the characteristic response is not sensed and stops the alternating generation when the characteristic response is first sensed, whereby the phase relationship of the fields in which the marker is first sensed is maintained until the characteristic response is confirmed or not established. The controller can advantageously comprise a microprocessor.

An electronic article surveillance system in accordance with another inventive arrangement comprises: an antenna having first and second antenna loops, the first and second antenna loops substantially lying in a common plane and partially overlapping; first and second transceiver circuits coupled to the first and second antenna loops respectively, the first and second transceiver circuits, when transmitting, alternately generating the first and second magnetic fields substantially in phase with one another and substantially out of phase with one another, the partial overlapping of the first and second antenna loops substantially preventing detuning the first and second loops; and, a detector for evaluating an output signal representative of signals received by the first and second transceiver circuits.

The system can advantageously further comprise a controller for the first and second transceiver circuits, the controller being responsive to the detector. The controller advantageously establishes the alternating generation of the magnetic field phases when the characteristic response is not sensed and stops the alternating generation when the characteristic response is first sensed, whereby the phase relationship of the fields in which the marker is first sensed is maintained until the characteristic response is confirmed or not established. The controller can advantageously comprises a microprocessor.

An electronic article surveillance system in accordance with yet another inventive arrangement comprises: an antenna having first and second antenna loops; first and second transceiver circuits coupled to the first and second antenna loops respectively; the first and second transceiver circuits, when transmitting, alternately generating first and second magnetic fields substantially in phase with one another and substantially out of phase with one another; a detector for evaluating an output signal, representative of the signals received by the first and second transceiver circuits from the interrogation zone, for a characteristic response of a marker to the magnetic fields; and, a microprocessor for controlling the first and second transceiver circuits, the controller being responsive to the detector.

The microprocessor advantageously establishes the alternating generation of the magnetic field phases when the characteristic response is not sensed and stops the alternating generation when the characteristic response is first sensed, whereby the phase relationship of the fields in which the marker is first sensed is maintained until the characteristic response is confirmed or not established.

In accordance with yet another inventive arrangement, an electronic article surveillance system comprises: a single antenna for transmitting and receiving signals, the single antenna having first and second antenna loops; first and second transceiver circuits coupled to the first and second antenna loops respectively, for respectively generating in a first mode of operation first and second pulsed magnetic fields together defining an interrogation zone for a marker generating a characteristic response to the magnetic fields in the interrogation zone, and for receiving signals from the interrogation zone in a second mode of operation; and, the first and second transceiver circuits, when transmitting, alternately generating the first and second magnetic fields substantially in phase with one another and substantially out of phase with one another.

Each of the first and second transceiver circuits comprises a tuned circuit and a receiver section, the receiver section being advantageously coupled across the tuned circuit.

In accordance with yet another inventive arrangement, an electronic article surveillance system comprises: an antenna having first and second antenna loops; first and second transceiver circuits coupled to the first and second antenna loops respectively, for respectively generating in a first mode of operation first and second pulsed magnetic fields together defining an interrogation zone for a marker generating a characteristic response to the magnetic fields in the interrogation zone, and for receiving signals from the interrogation zone in a second mode of operation; each of the first and second transceiver circuits having a phase controllable transmitter section and a phase controllable receiver section; and, a controller for independently phase controlling the transmitter and receiver sections.

In accordance with yet another inventive arrangement, an electronic article surveillance system comprises: an antenna having first and second antenna loops substantially lying in a common plane and partially overlapping; first and second transmitter circuits coupled to the first and second antenna loops respectively, for respectively generating in a first mode of operation first and second pulsed magnetic fields together defining an interrogation zone for a marker generating a characteristic response to the magnetic fields in the interrogation zone; and, the first and second transmitter circuits, when transmitting, alternately generating the first and second magnetic fields substantially in phase with one another and substantially out of phase with one another, the partially overlapping antenna loops preventing detuning of the transmitters otherwise resulting from the phase alternating.

In accordance with yet another inventive arrangement, an electronic article surveillance system comprises: a single antenna for transmitting and receiving signals, the single antenna having first and second antenna loops substantially lying in a common plane and partially overlapping; first and second transceiver circuits coupled to the first and second antenna loops respectively, for respectively generating in a first mode of operation first and second pulsed magnetic fields together defining an interrogation zone for a marker generating a characteristic response to the magnetic fields in the interrogation zone, and for receiving signals from the interrogation zone in a second mode of operation; and, the first and second transceiver circuits, when transmitting, alternately generating the first and second magnetic fields substantially in phase with one another and substantially out of phase with one another, the partially overlapping antenna loops preventing detuning of the transceivers otherwise resulting from the phase alternating.

Advantageously, the system can further comprise: each of the first and second transceiver circuits having a phase controllable transmitter section and a phase controllable receiver section; and, a controller for independently phase controlling the transmitter and receiver sections.

Advantageously, each of the first and second transceiver circuits comprises a tuned circuit, the respective receiver section of each the transceiver circuit being coupled across the respective tuned circuit of each the transceiver circuit.

In each of the inventive arrangements, and insofar as single loops or coils are concerned, the single loops advantageously generate a magnetic field having a certain flux geometry during a transmitting mode of operation, the same certain flux geometry affecting the antenna in a receiving mode of operation. This is not always true for multiple loop or coil antennas. For instance, if the upper and lower loops or coils transmit in aiding mode, but during receive intervals the coils are configured in figure-8 mode, for noise rejection, then a horizontal marker located on the plane along the top-to-bottom center line would be strongly stimulated by the transmit field, but would be in a null zone for the figure-8 receiver antenna.

BRIEF DESCRIPTION OF THE DRAWINGS

FIG. 1 shows a combination transmitting and receiving antenna configuration in accordance with the inventive arrangements, in an in-phase or aiding mode of transmission.

FIG. 2 shows the combination transmitting and receiving antenna configuration of FIG. 1, in an out-of-phase, figure-8 or opposing mode of transmission.

FIG. 3 is a block diagram of a transceiver circuit in accordance with the inventive arrangements for use with any one of the antenna loops shown in FIGS. 1 and 2.

DETAILED DESCRIPTION OF THE PREFERRED EMBODIMENTS

Figure 4:
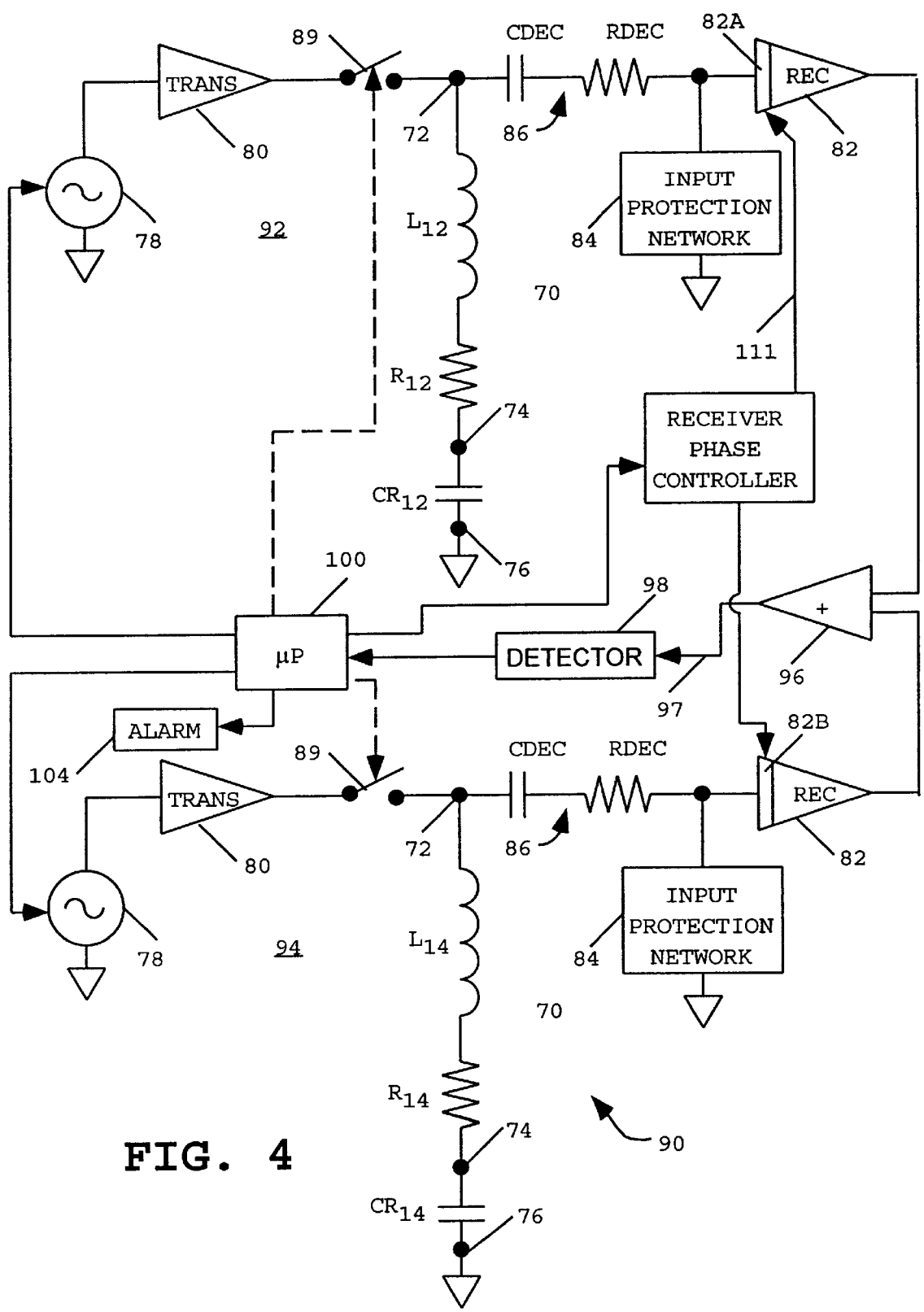
FIG. 4 is a block diagram of a transceiver circuit in accordance with the inventive arrangements for use with both loops of the antenna shown in FIGS. 1 and 2.
Figure 5:
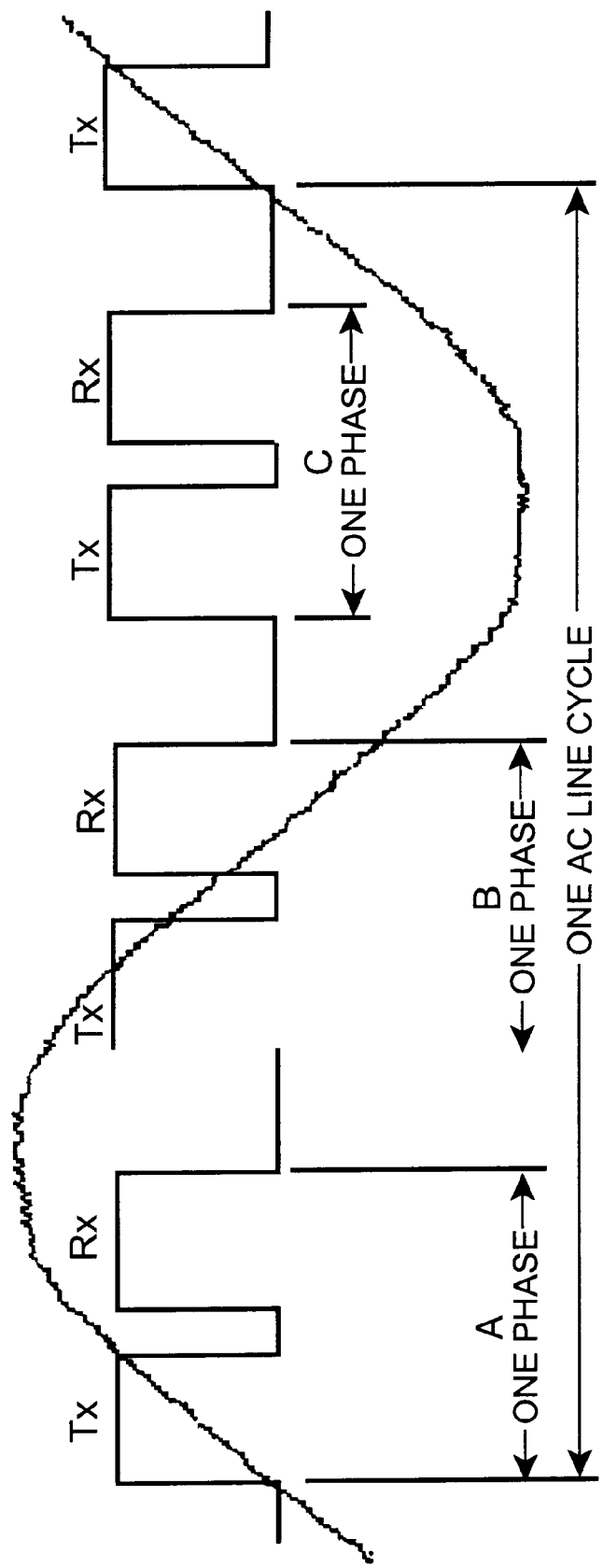
FIG. 5 is a timing diagram useful for explaining the is operation of the transceiver circuits shown in FIGS. 3 and 4.

The two most common antenna configurations for EAS systems are a single, contiguous loop, which may be circular, oval, triangular or rectangular, and a "figure-8" loop as shown in FIGS. 1 and 2 respectively. The single rectangular loop configuration is also referred to as an in-phase or aiding configuration. The "figure-8" configuration is also referred to as an out-of-phase or opposing configuration. These configurations are implemented by using two adjacent loops, as shown, sometimes built into a pylon and sometimes built into a wall or other structure.

In FIG. 1, antenna 10 has an upper loop 12 and a lower loop 14. The loops 12 and 14 are driven by current flowing in the same direction. In loop 12, the current is represented by arrows 22, 24, 26 and 28. In loop 14, the current is represented by arrows 30, 32, 34 and 36. In accordance with the right-hand rule, current loops 12 and 14 generate magnetic fields oriented in the same direction, namely the direction indicated by arrows 50 and 52, respectively. The current 26 in the bottom leg 18 of upper loop 12 and the current 30 in the top leg 16 of lower loop 14 flow in opposite directions. Accordingly, the respective fields generated by currents 26 and 30 mostly cancel out one another. The overall effect is that of a single, large rectangular loop. This is referred to as an in-phase or aiding mode of operation.

Typically, the lower leg 18 of upper loop 12 and the upper leg 16 of lower loop 14 coincide or substantially coincide with one another. In accordance with an inventive arrangement, the upper and lower loops 12 and 14 overlap one another vertically to define three zones or areas designated A, B and C. Zone A represents the effective area of only the upper loop 12. Zone B represents the effective area of only the lower loop 14. Zone C represents the effective area of the overlapped portions of the upper and lower loops.

In FIG. 2, the upper loop 12 and a lower loop 14 of antenna 10 are driven by current flowing in opposite directions. In loop 12, the current is represented by arrows 22, 24, 26 and 28, as in FIG. 1. In loop 14, the current is represented by arrows 40, 42, 44 and 46. In accordance with the right-hand rule, current loops 12 and 14 generate magnetic fields oriented in opposite directions, namely the directions indicated by arrows 50 and 54, respectively. The current 26 in the bottom leg 18 of upper loop 12 and the current 40 in the top leg 16 of lower loop 14 flow in the same direction. Accordingly, the respective fields generated by currents 26 and 40 reinforce one another. The overall effect is that of two smaller rectangular loops which form a large "figure-8". This is referred to as an out-of-phase or opposing mode of operation.

In the aiding configuration of FIG. 1, current flows in the same relative direction in both the upper and lower coil. Effectively, the sides bounding zone C cancel each other out and the antenna functions as if it were a single loop, nearly twice as long as the individual coils. Accordingly, the in-phase configuration will provide substantial horizontal magnetic field, but a significantly lower or even zero valued vertical component, that is a null zone or area, especially at the vertical center area C of the interrogation zone.

In the opposing configuration, the current flowing in the lower coil is in the opposite direction from that in the upper coil. The fields produced by the coils are in opposite directions, and there is a strong vertical component to the flux in the vicinity of zone C, due both to this opposition and the fact that each of the horizontal coil elements bounding zone C carry equal current in the same direction. Since these two members are physically close, they act in tandem as if they were a single element carrying twice the current of a single coil. The flux generated is in the same direction as the flux produced by the rest of each coil, so it is additive. Accordingly, in the out-of-phase transmitter configuration the vertical magnetic field becomes stronger but the horizontal component becomes weaker or even zero valued, also creating a null zone near area C.

Two current carrying coils placed in proximity to each other will produce fields which interact. These interacting fields, in turn, influence the parameters of each of the coils, such as their impedance, effective inductance and Q. If each coil is part of a resonant circuit, this proximal relationship affects the tuning of each individual circuit. Additionally, the direction of influence of each coil on the other reverses if the phase relationship is reversed. This leads to serious design problems if two coils are intended to be operated in close proximity, at resonance and with multiple phase conditions. If the antennas are tuned to resonance in one phase condition to maximize the current in the antennas, then reversing the direction of current in one of the coils reverses the phase of its flux. Both antennas are de-tuned by an amount that varies with the areas of the coils, the orientation and distance between them, and the Q of the tuned circuits. This detuning results in a loss in coil current and corresponding magnetic field.

It has been discovered, however, that a special case exists wherein the tuning situation can be optimized. If the coils are arranged to have a controlled amount of overlap, as shown in zone C in FIGS. 1 and 2, there is an optimal point wherein the field produced by zone C offsets the expected interaction between zones A and B. This optimum area relationship between zones A, B and C depends on the flux density in the area of overlap, the shape of the two coils, their geometrical relationship (that is, which two sides or corners overlap) and coil properties, such as the spacing between individual windings and the diameter of the overall wire bundle. For this reason, the optimum point is best determined empirically. The antennas are tuned individually and, while alternately reversing the direction of current in one of the coils, the magnitude of the coil current is monitored while the overlap between the coils is gradually increased and decreased. The optimum point is reached when the current is equal for either phase condition. For the two equal area, rounded rectangular coils 12 and 14 shown in FIGS. 1 and 2, the optimum point has been found to occur when zone C is approximately 11% of the area of either coil.

The transceiver circuit 70 shown in FIG. 3 can be used in conjunction with each of the loops 12 and 14 of the antenna 10 shown in FIGS. 1 and 2 so that the antenna 10 can be used for both transmit and receive functions in an EAS system. A signal generator 78 supplies an input signal to a transmitter 80 at a desired frequency. The transmitter 80 drives a resonant antenna, for example antenna 10 represented by inductor $L_A$ and resistor $R_C$, at sufficient current to produce the desired magnetic field in the EAS system's interrogation zone. The resonating capacitor $C_R$ can functionally exchange places with the antenna coil $L_A$ and the antenna coil's resistance $R_C$ with no change in function. In a practical EAS system, the reactive voltage at resonance, between points nodes 72 and 74 or between nodes 74 and 76, can easily exceed 1000 volts. At resonance, the coil current is equal to the driving voltage divided by the coil resistance, and the coil voltage is equal to the driving voltage times the antenna Q. Connecting the receiver circuitry across the antenna coil is impractical with these potentials. If, however, the receiver circuit 82 is connected directly to the output of the transmitter amplifier 80 and across the entire resonant antenna, the receiver is only exposed to the peak output voltage of the transmitter, on the order of tens of volts, which is a much more desirable situation. A decoupling network 84 between the transmitter output and the receiver input includes a capacitor $C_{DEC}$ and a resistor $R_{DEC}$. The receiver is also protected by an input protection network 84, which can comprise back to back diodes and a resistor as is known in the art. The values of the components will vary according to the frequency of operation.

In the circuit of FIG. 3 it can be seen that the relationship of the phase of the coil to the receiver input remains fixed with regard to signals magnetically coupled to the coil when the transmitter is off, regardless of the phase of the current in the coil produced by the transmitter. The receiver is coupled across the entire tuned circuit.

In accordance with the pulse mode of operation, the transmitter is coupled to the transceiver circuit through a switch that is responsive to a controller 88. Controller 88 may be responsive to a microprocessor, or may itself be a microprocessor. The transmitter is decoupled form the correct except during transmission of the pulses.

Two duplicate single loop transceiver circuits 92 and 94 can be connected with a common ground, as shown by transceiver circuit 90 in FIG. 4. Each of the circuits 92 and 94 is essentially identical to the transceiver circuit 70 shown in FIG. 3, except that one of the circuits, for example circuit 94, can transmit out of phase with the circuit 92. The phase of the signal generators 78 in circuits 92 and 94 can be controlled by a microprocessor 98. Transceiver circuit 92 is shown as being connected to the upper loop in FIGS. 1 and 2, by designation of the inductor as $L_{12}$. Transceiver circuit 94 is shown as being connected to the lower loop in FIGS. 1 and 2, by designation of the inductor as $L_{14}$.

The phase of the current in one of the coils $L_{12}$ and $L_{14}$ can be alternately reversed with respect to the other one of the coils $L_{12}$ and $L_{14}$, while the phase of signals induced in the coils while in receive mode remains fixed. The fields generated by the respective loops have either substantially a 0° phase difference, as shown in FIG. 1, or substantially a 180° phase difference, as shown in FIG. 2. In this mode of operation, one of the antenna loops becomes a reference loop, or reference coil, with respect to the other loop, or coil. The signals from receivers 82 and 84 can be summed by operational amplifier 96 into a common signal on line 97 representing the ambient field seen by both loops 12 and 14.

Phase control circuitry 110 can be advantageously included, controlled by a microprocessor 100, to independently change the phase of signals passing through input stages 82A and 82B of receivers 82 in circuits 92 and 94 respectively, such that the composite signal on line 97 can preferentially represent sum or difference signal components.

The ambient field signal is an input to a detector 98, which evaluates the ambient field signal to determine if a marker or tag is in the interrogation zone. The output of the detector 98 is an input to the microprocessor 100. An alarm indicator 104 can be activated by the microprocessor as shown, or alternatively, by an output from the detector 98, not shown.

In a more general case, receiver input stages 82A and 82B might each be connected to separate input detectors 98, and their respective phase and amplitude relationships determined by microprocessor 100 under software control.

This ability to independently reverse the phase of one of the transmitter coils is particularly advantageous because, as noted above, depending on the coil phase relationship, magnetic markers in some orientations and locations within the system's interrogation zone may not be adequately stimulated to produce a response in the null zones or areas. If the phase of one of the coils is reversed, these null areas change location and/or orientation, such that if a marker is in a null area for one relative phase condition, it will not be in a null area for the other relative phase condition. System software in the microprocessor 100 can control the relative transmitter phasing in such a way as to alternate between aiding, or in-phase, and opposing, or out-of-phase relative phase conditions of the transceiver circuits 92 and 94 until such time that a magnetic marker response is first sensed. Upon such first sensing, the phase relationship is held fixed until such time as a validation sequence is either successfully completed and an alarm generated, or the sequence fails, after which the transmitters return to alternating mode.

An EAS system using a single coil for both transmit and receive functions, with independent phase control, provides a significant performance improvement, allowing lower transmitter power and optimal field relationships between transmit and receive functions. If a magnetic marker is located within the system's interrogation zone in such a location and orientation that it is optimally stimulated by the magnetic field generated by an antenna, then it is simultaneously in an optimum orientation for its response signal to be received by the same antenna. Such an EAS system also entails lower manufacturing costs and better performance than existing designs.

What is claimed is:

1. An electronic article surveillance system, comprising:

an antenna having first and second antenna loops;

first and second transceiver circuits coupled to said first and second antenna loops respectively, for respectively generating in a first mode of operation first and second magnetic fields together defining an interrogation zone for a marker generating a characteristic response to said magnetic fields in said interrogation zone, and for receiving signals from said interrogation zone in a second mode of operation;

said first and second transceiver circuits, when transmitting, alternately generating said first and second magnetic fields substantially in phase with one another and substantially out of phase with one another; and, a detector for evaluating an output signal, representative of said signals received by said first and second transceiver circuits from said interrogation zone, for said characteristic response of said marker.

2. The system of claim 1, wherein said first and second antenna loops substantially lie in a common plane and partially overlap.

3. The system of claim 1, wherein said first transceiver circuit comprises:

a first signal generator;

a first receiver; and, a first transmitter responsive to said first signal generator and coupled to said first antenna loop and to said first receiver.

4. The system of claim 3, wherein said second transceiver circuit comprises:

a second signal generator;

a second receiver; and, a second transmitter responsive to said second signal generator and coupled to said second antenna loop and to said second receiver.

5. The system of claim 1, further comprising a controller for said first and second transceiver circuits, said controller being responsive to said detector.

6. The system of claim 1, wherein said controller establishes said alternating generation of said magnetic field phases when said characteristic response is not sensed and stops said alternating generation when said characteristic response is first sensed, whereby said phase relationship of said fields in which said marker is first sensed is maintained until said characteristic response is confirmed or not established.

7. The system of claim 6, wherein said controller comprises a microprocessor.

8. The system of claim 1, wherein said antenna generates a magnetic field having a certain flux geometry during said first mode of operation, said same certain flux geometry affecting said antenna in said second mode of operation.

9. An electronic article surveillance (EAS) system, comprising:

an antenna having first and second antenna loops, said first and second antenna loops substantially lying in a common plane and partially overlapping;

first and second transceiver circuits coupled to said first and second antenna loops respectively, said first and second transceiver circuits, when transmitting, alternately generating said first and second magnetic fields substantially in phase with one another and substantially out of phase with one another, said partial overlapping of said first and second antenna loops substantially preventing detuning said first and second loops; and, a detector for evaluating an output signal representative of signals received by said first and second transceiver circuits.

10. The system of claim 9, further comprising a controller for said first and second transceiver circuits, said controller being responsive to said detector.

11. The system of claim 10, wherein said controller establishes said alternating generation of said magnetic field phases when said characteristic response is not sensed and stops said alternating generation when said characteristic response is first sensed, whereby said phase relationship of said fields in which said marker is first sensed is maintained until said characteristic response is confirmed or not established.

12. The system of claim 11, wherein said controller comprises a microprocessor.

13. The system of claim 1, wherein said antenna generates a magnetic field having a certain flux geometry during a transmitting mode of operation, said same certain flux geometry affecting said antenna in a receiving mode of operation.

14. An electronic article surveillance (EAS) system, comprising:

an antenna having first and second antenna loops;

first and second transceiver circuits coupled to said first and second antenna loops respectively;

said first and second transceiver circuits, when transmitting, alternately generating first and second magnetic fields substantially in phase with one another and substantially out of phase with one another;

a detector for evaluating an output signal, representative of said signals received by said first and second transceiver circuits from said interrogation zone, for a characteristic response of a marker to said magnetic fields; and, a microprocessor for controlling said first and second transceiver circuits, said controller being responsive to said detector.

15. The system of claim 14, wherein said microprocessor establishes said alternating generation of said magnetic field phases when said characteristic response is not sensed and stops said alternating generation when said characteristic response is first sensed, whereby said phase relationship of said fields in which said marker is first sensed is maintained until said characteristic response is confirmed or not established.

16. The system of claim 14, wherein said antenna generates a magnetic field having a certain flux geometry during a transmitting mode of operation, said same certain flux geometry affecting said antenna in a receiving mode of operation.

17. An electronic article surveillance system, comprising:

a single antenna for transmitting and receiving signals, said single antenna having first and second antenna loops;

first and second transceiver circuits coupled to said first and second antenna loops respectively, for respectively generating in a first mode of operation first and second pulsed magnetic fields together defining an interrogation zone for a marker generating a characteristic response to said magnetic fields in said interrogation zone, and for receiving signals from said interrogation zone in a second mode of operation; and, said first and second transceiver circuits, when transmitting, alternately generating said first and second magnetic fields substantially in phase with one another and substantially out of phase with one another.

18. The system of claim 17, wherein each of said first and second transceiver circuits comprises a tuned circuit and a receiver section, said receiver section being coupled across said tuned circuit.

19. An electronic article surveillance system, comprising:

an antenna having first and second antenna loops;

first and second transceiver circuits coupled to said first and second antenna loops respectively, for respectively generating in a first mode of operation first and second pulsed magnetic fields together defining an interrogation zone for a marker generating a characteristic response to said magnetic fields in said interrogation zone, and for receiving signals from said interrogation zone in a second mode of operation;

each of said first and second transceiver circuits having a phase controllable transmitter section and a phase controllable receiver section; and, a controller for independently phase controlling said transmitter and receiver sections.

20. An electronic article surveillance system, comprising:

an antenna having first and second antenna loops substantially lying in a common plane and partially overlapping;

first and second transmitter circuits coupled to said first and second antenna loops respectively, for respectively generating in a first mode of operation first and second pulsed magnetic fields together defining an interrogation zone for a marker generating a characteristic response to said magnetic fields in said interrogation zone; and, said first and second transmitter circuits, when transmitting, alternately generating said first and second magnetic fields substantially in phase with one another and substantially out of phase with one another, said partially overlapping antenna loops preventing detuning of said transmitters otherwise resulting from said phase alternating.

21. An electronic article surveillance system, comprising:

a single antenna for transmitting and receiving signals, said single antenna having first and second antenna loops substantially lying in a common plane and partially overlapping;

first and second transceiver circuits coupled to said first and second antenna loops respectively, for respectively generating in a first mode of operation first and second pulsed magnetic fields together defining an interrogation zone for a marker generating a characteristic response to said magnetic fields in said interrogation zone, and for receiving signals from said interrogation zone in a second mode of operation; and, said first and second transceiver circuits, when transmitting, alternately generating said first and second magnetic fields substantially in phase with one another and substantially out of phase with one another, said partially overlapping antenna loops preventing detuning of said transceivers otherwise resulting from said phase alternating.

22. The system of claim 21, further comprising:

each of said first and second transceiver circuits having a phase controllable transmitter section and a phase controllable receiver section; and, a controller for independently phase controlling said transmitter and receiver sections.

23. The system of claim 22, wherein each of said first and second transceiver circuits comprises a tuned circuit, said respective receiver section of each said transceiver circuit being coupled across said respective tuned circuit of each said transceiver circuit.

* * * * *